United States Patent
Wilson et al.

(10) Patent No.: US 10,527,765 B2
(45) Date of Patent: Jan. 7, 2020

(54) SURFACES HAVING STRUCTURED OPTICAL APPEARANCES

(71) Applicant: Apple Inc., Cupertino, CA (US)

(72) Inventors: James R. Wilson, San Jose, CA (US); Christopher D. Prest, San Francisco, CA (US); Matthew S. Rogers, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 355 days.

(21) Appl. No.: 15/266,141

(22) Filed: Sep. 15, 2016

(65) Prior Publication Data

US 2017/0090084 A1    Mar. 30, 2017

Related U.S. Application Data

(60) Provisional application No. 62/234,312, filed on Sep. 29, 2015, provisional application No. 62/239,652, filed on Oct. 9, 2015.

(51) Int. Cl.
*G02B 5/20* (2006.01)
*G02B 5/28* (2006.01)
*G02B 1/10* (2015.01)

(52) U.S. Cl.
CPC ............. *G02B 5/286* (2013.01); *G02B 5/206* (2013.01); *G02B 1/10* (2013.01)

(58) Field of Classification Search
CPC .... G02B 5/0289; G02B 5/021; G02B 5/0226; G02B 5/0242; G02B 5/0247;
(Continued)

(56) References Cited

U.S. PATENT DOCUMENTS

| | | | |
|---|---|---|---|
| 6,813,094 B2 | 11/2004 | Kaminsky et al. | |
| 6,842,282 B2 | 1/2005 | Kuroda et al. | |

(Continued)

FOREIGN PATENT DOCUMENTS

| | | |
|---|---|---|
| CN | 101124273 | 2/2008 |
| CN | 102308231 | 1/2012 |

(Continued)

OTHER PUBLICATIONS

Lou et al., "The Fabrication of $TiO_2$ Porous Ceramic Structure," Journal of Shanghai Jiaotong University, No. 2, 314, Dec. 2007, pp. 306-309.

(Continued)

*Primary Examiner* — Marin Pichler
(74) *Attorney, Agent, or Firm* — Dorsey & Whitney LLP

(57) ABSTRACT

Surfaces having structured optical appearances are disclosed. The surface can include substrate, a first optical coating disposed on the substrate having a first refractive index; and a second optical coating disposed on the first optical coating having a second refractive index. The first refractive index is different than the second refractive index. Other surfaces can include a substrate having a visible surface, wherein the visible surface comprises a plurality of structural features, wherein each of the structural features is configured to transmit a light wave that optically interacts with waves of light of other structural features to create a visual appearance. Still other surfaces can include a substrate and an optical coating disposed on the substrate. The optical coating comprising particles in an ordered array within a matrix, wherein the matrix has a first refractive index and the particles have a second refractive index.

6 Claims, 10 Drawing Sheets

(58) Field of Classification Search
CPC ...... G02B 5/0231; G02B 5/0294; G02B 5/20; G02B 5/206; G02B 5/3008; G02B 5/3058; G02B 1/10; G02B 27/1006; G02F 1/169; G02F 1/133504; G02F 1/133553; G02F 1/133555; G02F 1/133606; G02F 1/133308
USPC .............. 359/580–582, 584, 589, 487.06
See application file for complete search history.

(56) References Cited

U.S. PATENT DOCUMENTS

| | | | |
|---|---|---|---|
| 7,760,424 | B2 | 7/2010 | Takeuchi et al. |
| 7,924,368 | B2 | 4/2011 | Fabick et al. |
| 8,009,351 | B2 | 8/2011 | Ando et al. |
| 8,384,630 | B2 | 2/2013 | Ray et al. |
| 9,030,736 | B2 | 5/2015 | Sadahiro et al. |
| 9,081,171 | B2 | 7/2015 | Dean et al. |
| 2003/0017316 | A1 | 1/2003 | Pfaff et al. |
| 2004/0104663 | A1 | 6/2004 | Umeya et al. |
| 2005/0206020 | A1* | 9/2005 | Baek ............... B82Y 20/00 264/1.21 |
| 2007/0103799 | A1 | 5/2007 | Chiang et al. |
| 2007/0115550 | A1* | 5/2007 | Nakayama ............ G02F 1/167 359/487.06 |
| 2009/0015908 | A1* | 1/2009 | Ando ................. G02B 5/206 359/359 |
| 2009/0224660 | A1* | 9/2009 | Nakanishi ......... H01L 51/5262 313/504 |
| 2010/0330331 | A1 | 12/2010 | Chiang et al. |
| 2012/0188295 | A1 | 7/2012 | Joo |
| 2012/0218653 | A1* | 8/2012 | Liu ................. G02B 1/005 359/868 |
| 2013/0133739 | A1 | 5/2013 | Kohnke et al. |
| 2013/0194668 | A1 | 8/2013 | Liang et al. |
| 2013/0199995 | A1* | 8/2013 | Jiang ............... B01D 67/0006 210/500.27 |
| 2014/0092464 | A1* | 4/2014 | Arsenault ............ B82Y 20/00 359/290 |
| 2014/0178647 | A1 | 6/2014 | Kim et al. |
| 2014/0233161 | A1 | 8/2014 | Liu |
| 2014/0295127 | A1 | 10/2014 | Tang et al. |
| 2015/0062709 | A1 | 3/2015 | Matsuyuki et al. |
| 2015/0177426 | A1* | 6/2015 | Sakoske ............... G02B 1/115 359/599 |
| 2015/0234098 | A1 | 8/2015 | Lofftus et al. |
| 2016/0377768 | A1 | 12/2016 | Wilson et al. |
| 2017/0068021 | A1 | 3/2017 | Wilson |
| 2017/0075386 | A1 | 3/2017 | Park |
| 2017/0139088 | A1 | 5/2017 | Iki et al. |
| 2017/0174565 | A1 | 6/2017 | Kase et al. |
| 2017/0321069 | A1 | 11/2017 | Zhao et al. |
| 2018/0057693 | A1 | 3/2018 | Wilson |
| 2018/0059443 | A1 | 3/2018 | Wilson |

FOREIGN PATENT DOCUMENTS

| | | |
|---|---|---|
| DE | 102012109808 | 6/2014 |
| EP | 1170618 | 1/2002 |
| JP | 2002-240423 | 8/2002 |
| KR | 10-2013-0123000 | 11/2013 |
| KR | 101336936 | 12/2013 |
| WO | WO 01/03945 | 1/2001 |
| WO | WO 2010/096914 | 9/2010 |
| WO | WO 2015/086858 | 6/2015 |
| WO | WO 2016/006538 | 1/2016 |

OTHER PUBLICATIONS

Eiden-Assmann et al., "Synthesis and Characterization of Porous and Nonporous Monodisperse Colloidal $TiO_2$ Particles," *Chem. Mater.*, 2004, vol. 16, pp. 6-11.

Wang et al, "Rapid Microwave Synthesis of Porous $TiO_2$ Spheres and Their Applications in Dye-Sensitized Solar Cells," *The Journal of Physical Chemistry*, 2011, vol. 115, pp. 10419-10425.

\* cited by examiner

SURFACES HAVING STRUCTURED OPTICAL APPEARANCES

CROSS-REFERENCE TO RELATED APPLICATIONS

This patent application claims the benefit under 35 U.S.C. § 119(e) of U.S. Patent Application No. 62/234,312 entitled "Surfaces Having Structured Optical Appearances", filed on Sep. 29, 2015, and U.S. Patent Application No. 62/239,652, entitled "Surfaces Having Structured Optical Appearances", filed on Oct. 9, 2015, both of which are incorporated herein by reference in their entirety.

FIELD

The described embodiments relate generally to surfaces having structured optical appearances. More particularly, the present embodiments relate to adjusting the visual appearance of a surface by using physical structures that create optical interference effects to change the color, opacity, and/or haze of a surface rather than chemical alteration through the use of dyes or pigments.

BACKGROUND

Structural color is observed in nature and has many characteristics that differ from those of chemical pigments or dyes. Typically color is due to light absorption, but structural color can both refract and reflect light. Reflection is the main mechanism for ordered structural color/photonic crystals, such as those seen in blue butterflies. Structural color can also work by reflective interference in the case of thin film multilayers.

Owing to its unique characteristics, there have been attempts at making artificial structural color through various technological approaches such as colloidal crystallization, dielectric layer stacking, and direct lithographic patterning. The colloidal crystallization technique is used to make a photonic crystal, which blocks a specific wavelength of light in the crystal and therefore displays the corresponding color. Dielectric layer stacking and lithographic patterning of periodic dielectric materials generates structural color by controlling the submicrometer structure of the surface.

Design of structural colored surfaces can provide adaptability or tunability to effect the visual appearance of a surface.

SUMMARY

In various aspects, the disclosure is directed to surfaces having structured optical appearances.

In one aspect, the surface having structured optical appearances includes a substrate, a first optical coating having a first refractive index, and a second optical coating having a second refractive index. The first optical coating is disposed on the substrate, and the second optical coating is disposed on the first optical coating. The first refractive index is different from the second refractive index. In certain variations, the first refractive index is lower than the second refractive index. In certain variations, the combined first and second optical coatings are configured to alter the specular reflectance of the surface.

In certain variations, the surface having a structured optical appearance can be colored with a dye or pigment. In additional variations, the substrate can be a glass, metal, or polymer. In further variations, the first optical coating can be a polymer and the second optical coating can be a conductive material.

In another aspect, the surface having a structured optical appearance includes a substrate with a visible surface. The visible surface includes a plurality of structural features. The structural features are configured to transmit or reflect a wavelength or range of wavelengths, thereby creating a structured optical appearance. Each light wave optically interacts with light waves of other structural features to create a visual appearance.

In some variations, the transmitted light wave can be reflected or scatted. In additional variations, the substrate can be a glass, metal, or polymer. In further variations, the surface having a structured optical appearance can include a plurality of gaps interposed between adjacent structural features. The gaps can absorb a wavelength or a range of wavelengths of light.

In another aspect, the surface having a structured optical appearance includes a substrate and an optical coating disposed thereon. The optical coating includes particles in an ordered array within a matrix. The matrix has a first refractive index, and the particles have a second refractive index. The ordered array is configured to reflect a wavelength or range of wavelengths, thereby creating a structured optical appearance.

In some variations, ordered array is a face centered cubic packing arrangement. In other variations, the ordered array is a hexagonal closed packing arrangement. In some variations, the particles are a ceramic, a polymer, or a void.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
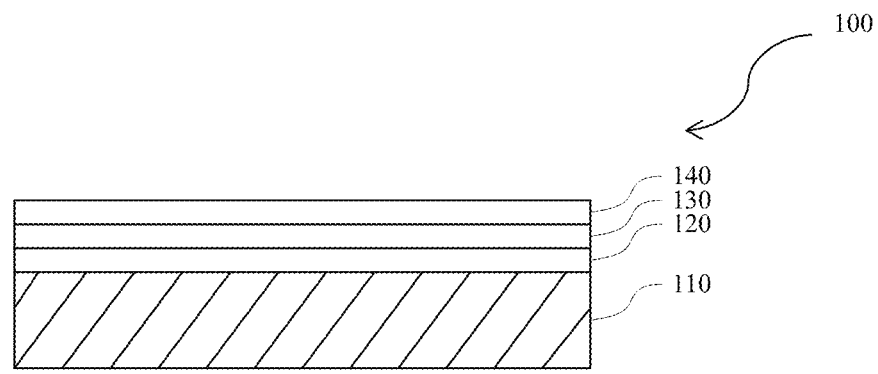
FIG. 1A shows a cross-sectional view of a surface having a structured optical appearance with multiple layers of different optical coatings deposited on a substrate, in accordance with embodiments of the disclosure.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to surface appearances, and more specifically to using structural color to affect the visual appearance of a surface. According to embodiments of the disclosure, surfaces having a structured optical appearances and methods of making surfaces having structured optical appearances are provided. The surface having a structured optical appearance can be created to design new surface appearances for articles of manufacturing. In some embodiments, the surface having a structured optical appearance can be tunable meaning that the visual appearance of the surface can be designed to have a specific color, haze, or opacity depending on environmental conditions. In some instances, the surface having a structured optical appearance can be designed to have specific appearances depending on viewing angle and/or incident light source. In some embodiments, the tunability of the surface having a structured optical appearance may be used to change the visual appearance based on a consumer preference. In other embodiments the tunability of the surface having a structured optical appearance may be used to change the visual appearance to act as a sensor or notification system to alert an observer.

The surfaces having structured optical appearances can be used to create a specific color, opacity, or haze by diffraction, interference, and/or scattering wavelengths of light rather than absorbing and/or reflecting light through the use of pigments or dyes. The embodiments of the disclosure relate to adjusting the visual appearance of a surface by using optical interference between transmitted waves of light to create color, opacity and/or haze of the surface. The transmission can include diffraction, reflection, refraction and/or scattering wavelengths of light.

In some embodiments, the visual appearance of a surface can be adjusted by creating a surface having a structured optical appearance including a multi-layered coated surface. In yet other embodiments, the visual appearance of the surface can be adjusted by creating a surface having a structured optical appearance having a plurality of optical features that create an optical interference effect. In other embodiments, the visual appearance of the surface can be adjusted by creating a surface having a structured optical appearance that includes colloidal or suspended particles with a periodic pattern in matrix.

These and other embodiments are discussed below with reference to FIGS. 1-4. However, those skilled in the art will readily appreciate that the detailed description given herein with respect to these figures is for explanatory purposes only and should not be construed as limiting.

In some embodiments, the visual appearance of a surface can be adjusted by creating a surface having a structured optical appearance including a multiple layers of optical coatings. The layers of optical coatings can be designed to control the amount of light reflected or transmitted at the surface for given wavelengths. FIG. 1A illustrates a surface 100 having a structured optical appearance with multiple layers of different optical coatings. The surface 100 having structured optical appearance includes substrate 110 with multiple layers of optical coatings 120, 130, and 140, which can be different or the same, to use optical interference to change the visual appearance of the substrate. The multiple layers of different optical coatings transmit (e.g., reflect) back different waves of light and optically interact with each other to create an optical effect that changes the visual appearance (e.g. color, opacity, and/or haze) of substrate 110. For example, in some embodiments, the multiple layers of optical coatings may create the optical effect through diffraction, interference, scattering, etc. such that the visual appearance of substrate 110 can be adjusted to create a specific color, haze, and/or opacity. The optical coatings can be selected to design an exact color, haze, or opacity for surface 100. Because the incident light on surface 100 is a wave, optical coatings 120, 130, and 140 each reflect or transmit back a different light wave. The optical coatings can be selected to have optically constructive or destructive interference to reflect a particular wavelength associated with a specific color that is different than the substrate. In other embodiments, the optical coatings can be selected to create a specific haze or opacity. The specific optical effects that will create the selected visual appearance can be designed by selection of the number of layers of optical coatings, the thickness of the optical coatings, the refractive index of each optical coating.

Referring to FIG. 1A, the surface having structured optical appearance 100 includes substrate 110. Substrate 110 may be formed of a transparent or semitransparent material. In other embodiments the substrate may be opaque. In some embodiments, substrate 110 can be a glass or metallic glass. In other embodiments, substrate 110 may be a metal (e.g. aluminum, stainless steel, etc.), a polymer or plastic, a soft good, or other suitable material.

As shown in FIG. 1A, a surface having structured optical appearance 100 includes multiple layers of optical coatings 120, 130, and 140. The optical coatings can be optically different in that they have different refractive indices. In some embodiments, the multiple layers may include an optical coating with a low refractive index and an optical coating with a high refractive index. In some embodiments, the surface having a structured optical appearance can include a first optical coating having a first refractive index and a second optical coating having a second refractive index. The first refractive index can be lower than the second refractive index.

The visual appearance of the substrate can be adjusted to achieve a specific color, opacity and/or haze without the use of painting, dyes, or pigments. The number of layers of optical coatings, thickness of the layers of optical coatings, and the refractive index of the layers of the optical coatings can affect the visual appearance of the surface and can be selected to obtain a specific color, opacity and/or haze. For example, the multiple layers of optical coatings can be selected such that the surface appears a specific shade of blue regardless of the viewing angles or contours of the surface. In other embodiments, the multiple layers of optical coatings can be selected such that the surface having a structured optical appearance is anti-reflective, thereby creating a uniform visual appearance regardless of the contours of the surface. Such embodiments with surfaces having anti-reflective structured optical appearance can be used to camouflage (i.e. visually hide) any surface imperfections like dents or dings.

In other embodiments, the surface having a structured optical appearance with the multiple layers of optical coatings can be selected such that the surface has a different visual appearance (e.g. color, haze, or opacity) depending on the viewing angle. By way of illustration, without intending to be limiting, the surface having a structured optical appearance may appear blue at a 90° viewing angle while appearing green at a 45° viewing angle. Other color, opacity, or haze combinations are possible.

In other embodiments, the multiple layers of different optical coatings can be selected to have a specific visual appearance that appears the same in different lighting conditions. The lighting conditions can refer to the source of light (e.g., sun, fluorescent, etc.); the amount of light (i.e., brightness); the quality of light; the color or tone of the light; the direction of light (e.g. front light, backlight), or other conditions. To illustrate this, in some instances a surface that is navy blue in natural light may appear black in to an observer under certain artificial lighting conditions. However, if the surface is made with a structured optical appearance in accordance with embodiments described herein, the surface can be designed such that it appears as the same navy blue in both the natural lighting and artificial lighting conditions. For example, in such embodiments, the surface with the structural optical appearance can be designed such that it absorbs a range of wavelengths in the visible and transmits back a specific band of wavelengths in the visible spectrum.

Figure 1B:
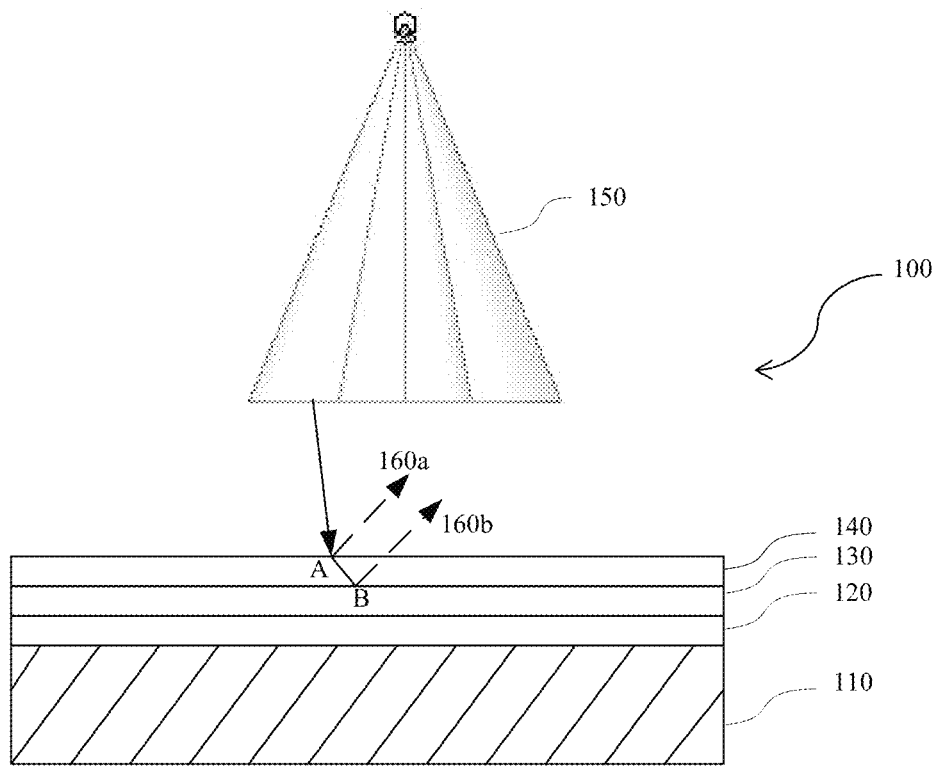
FIG. 1B shows a cross-sectional view of a beam of light impacting the surface of FIG. 1A and the light being reflected.

Although the surface 100 having a structured optical appearance of FIGS. 1A and 1B is depicted as having three layers of optical coatings, this is for illustrative purposes only and not intended to be limiting. In other embodiments, any number of different optical coatings can be used from two layers or more. By changing the number of layers, the combined optical effect of the waves of light reflected or transmitted from each of the optical coating changes thereby adjusting the visual appearance of surface 100.

Layers of optical coatings 120, 130 and 140 can have any thickness. In some embodiments, each optical coating layer may have the same thickness, while in other embodiments, the optical coating layers can have different thicknesses. In some embodiments, some optical coating layers may have the same thickness while other optical coating layers are different. The thickness of the layers can affect the visual appearance of the surface through thin-film interference. Thin-film interference occurs when incident light waves that are reflected by the upper and lower boundaries of a thin film (e.g., an optical coating) interfere with one another to form a new wave. The degree of constructive or destructive interference between the two light waves depends on the difference in their phase. This difference in part depends on the thickness of the optical coating.

As illustrated in FIG. 1B, beam of light 150 is incident to surface 100. As the light beam 150 travels, it impacts surface 100 at point A on the upper boundary of coating 140 and a portion of the light is reflected as wave 160a, while another portion of the light continues to travel through coating 140 to the lower boundary. At point B of the lower boundary, another portion of the light is reflected as wave 160b. Reflected waves 160a and 160b can interfere with each other. The degree of constructive or destructive interference between waves 160a and 160b will depend on the difference in their phases. Their phase differences can depend on the thicknesses of the optical coating, which has an impact on the optical path of the reflected waves.

By changing the thickness of an optical coating, the optical paths of the reflected waves from the upper and lower boundaries of a coating change and the difference between the optical paths (as referred to as the optical path difference or OPD) can be increased or decreased to affect the degree of interference. For example, without intending to be limiting, if the thickness of coating 140 is changed, the optical paths of the reflected waves from the upper and lower boundaries of coating 140 are changed and result in a different OPD and determine the degree of interference. The thickness of any of optical coatings 120, 130 or 140 can be changed. In some embodiments, the visual appearance of the surface that results from this interference can appear as light and dark bands or as colorful bands depending upon the source of the incident light.

Additionally, the visual appearance of the substrate can be altered by changing the thicknesses of the different optical coatings, alone or in combination. For example, without intending to be limiting, if the thickness of coating 120 was altered (i.e., increased or decreased) the optical effect created through the interference of the reflected or transmitted wave interacting with the reflected or transmitted light wave from coating 130 can change, thereby altering the visual appearance of surface 100. The adjustment of the degree of optical interference can be used to alter the color, opacity and/or haze of the surface 100.

In other embodiments, the thickness of the optical coatings can change in response to environmental conditions (e.g., humidity, electrical field, magnetic field, etc.). For example, without intending to be limiting, coating 120 (or any of the other coatings) can be a material that swells in response to high humidity (e.g., 70% or more). The increase in the thickness of coating 120 can change how the waves of reflected light interact as described above regarding thin film interference. In some embodiments, the coating may swell at different rates depending on the degree of humidity. This example of swelling in response to humidity is intended to be illustrative. In other embodiments, other environmental conditions can result in the thickness of an optical coating to increase or decrease, thereby affecting the optical paths of the reflected waves of light and the degree of interference, in accordance with the principle of thin film interference as described above. For example, in some embodiments, an optical coating can contract in response to an environmental condition such that the thickness of the coating decreases.

Figure 1C:
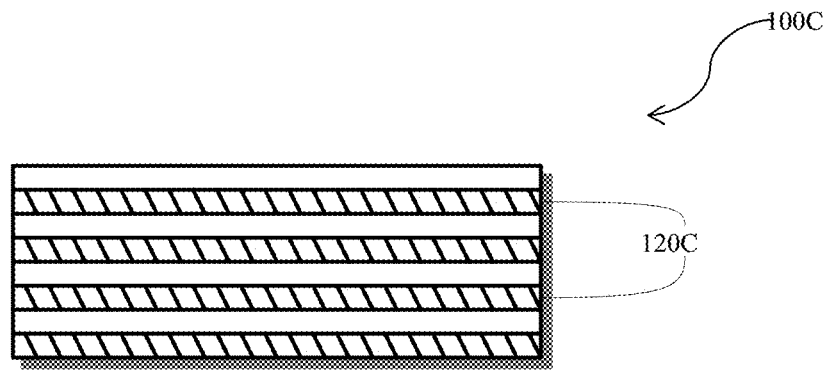
FIG. 1C shows a surface with a structured optical appearance with optical coatings selectively deposited in a stripped pattern.
Figure 1D:
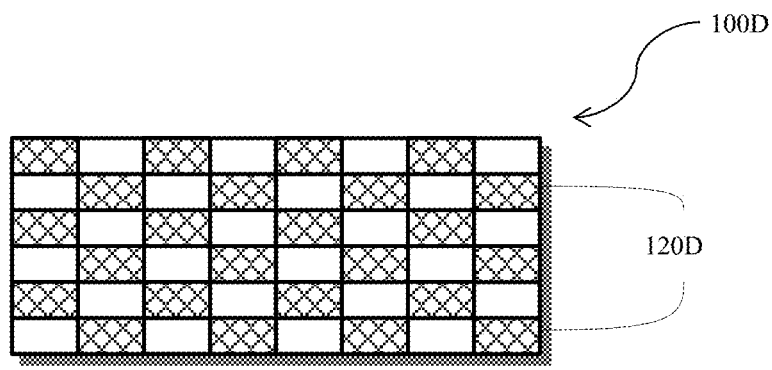
FIG. 1D shows a surface with a structured optical appearance with optical coatings selectively deposited in a checkered pattern.
Figure 1E:
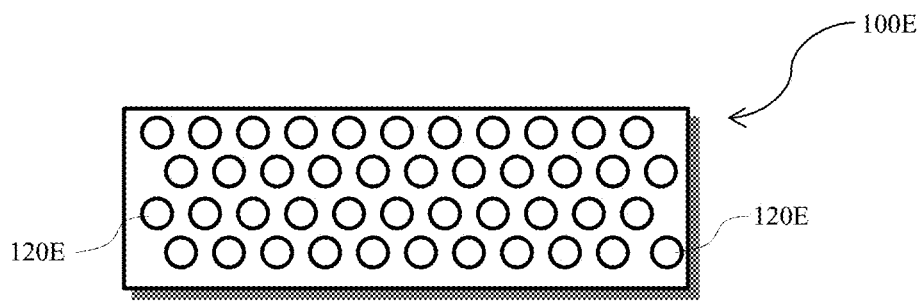
FIG. 1E shows a surface with a structured optical appearance with optical coatings selectively deposited in a polka dotted pattern.

In some embodiments, the optical coatings can be patterned. In such embodiments, the different optical coatings can be selectively deposited on portions of substrate 110 to change the visual appearance in select portions of the substrate while other regions of the substrate have a visual appearance that remains unaltered. In such embodiments, the layers of optical coatings can be deposited on regions of the surface while other portions of the surface do not have coatings. The selective depositing of the optical coatings can be used to create patterns on surface 110, as illustrated in FIGS. 1C-1E. In FIG. 1C, optical coating 120C can be deposited in a striped pattern on surface 100C. In FIG. 1D, optical coating 120D can be deposited in a checkered pattern on surface 100D. In FIG. 1E, optical coating 120E can be deposited in a polka dot pattern on surface 100E. It will be recognized to those skilled in the art that other patterns are possible.

In some embodiments, the layers of optical coatings can be altering layers of different materials. For example, in one embodiment coatings 120 and 140 can be the same material while coating 130 is a different material. In some embodiments, the optical coatings can be alternating layers of a dielectric material. For example, in one embodiment the optical coatings can a metalloid (e.g. Si) and a dielectric (e.g. $SiO_2$). In another embodiment, one of the optical coatings can be a polymer while a second optical coating layer can be a conductive material. In some embodiments, the conductive material can be a transparent conductive material. In still other embodiments, an optical coating can be a magnetic material. Other materials are possible.

In other embodiments, the surface having a structured optical appearance can include an air gap or gas between the layers of different optical coatings. The air gap or other gas can have an index of refraction that is different than the multiple layers of optical coatings. In some embodiments, a paint, dye or pigment can also optionally be applied to the substrate and then the multiple layers of different optical coatings can be deposited on the painted, dyed or pigmented substrate.

The multiple layers of different optical coatings can be deposited on the substrate using any known layer deposition technique. In some embodiments, the optical coatings may be deposited using sputtering, vapor deposition (chemical or physical), spraying, dip coating, laminating, or other suitable deposition methods.

In yet other embodiments, the visual appearance of the surface can be adjusted by creating a surface having a structured optical appearance with a plurality of structural features that create an optical interference effect. Similar to the thin-film interference described above with respect to the optical coatings, the structural features on the surface reflect back waves of incident light. The reflected waves of light from the structural features can interfere constructively or destructively. In other embodiments, the visual appearance of the surface having a structured optical appearance can be altered by adding surface texture or other physical modification to the surface of a substrate. The physical modifications can be a surface texture and or other structural feature that can create an optical effect. For example, as seen in FIG. 2A, the surface of the substrate can be modified to create a plurality of structural features (e.g., quantum wells, convex and/or concave surfaces) that absorb and/or reflect specific frequencies or wavelengths.

Figure 2A:
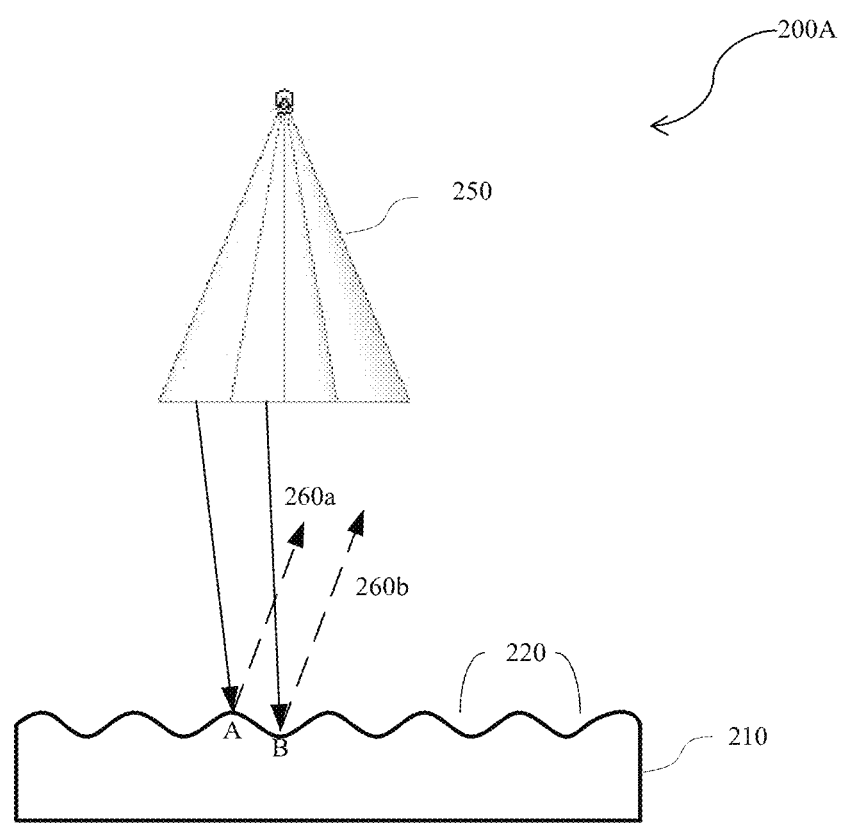
FIG. 2A shows a cross-sectional view of surface having a structured optical appearance with structural features on a substrate and how a portion of an incident light beam is reflected, in accordance with embodiments of the disclosure.
Figure 2B:
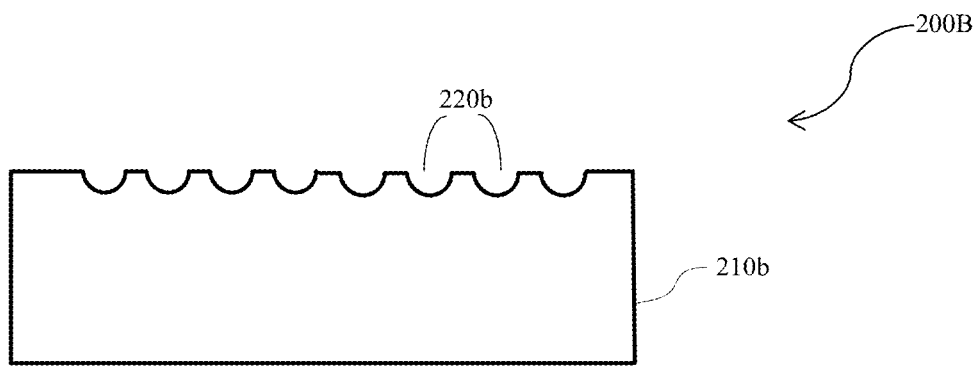
FIG. 2B shows a cross-sectional view of another surface having a structured optical appearance with structural features.

FIG. 2A illustrates structured colored surface 200A with substrate 210 including a plurality of structural features 220. The structural features can create optical effects through reflection, absorption, scattering, etc., that can create specific colors on surface 200A. Specific optical effects can be designed by selection of the size of the structural features, the shape of the structural features, the pattern of the structural features (e.g., how close or space apart the features are placed.

As shown in FIG. 2A, surface 200A includes substrate 210 with a plurality of structural features 220. Like substrate 110 of FIG. 1A, substrate 210 can be may be formed of a glass or metallic glass. In other embodiments, substrate 210 may be a metal (e.g. aluminum, stainless steel, etc.), a plastic or polymer, soft good, or other suitable material. The structural features are depicted as a series of concave and convex features, this is for illustrative purposes only, and the structural features can be any shape.

As illustrated in FIG. 2A, wave of incident light 250 can impact the structural features 220 of surface 200. As depicted, incident beam of light 250 impacts structural features 220 at points A and B, which each create light wave 260a and light wave 260b that are both reflected. Light waves 260a and 260b can interfere destructively or constructively. Whether the reflected waves have destructive or constructive interference can be selected depending on the size, shape, and/or pattern of the structural features, which affect the optical paths and phase differences of light wave 260a and 260b. By changing the structural feature size, the structural feature shape, and/or order or pattern of the optical features, the combined optical effect from the interference of the reflected waves of light can change thereby adjusting the visual appearance of surface 200A. In other embodiments, the structural features can be designed on to be on a macro-scale such that structural features create an optical scattering effect, thereby having the result of changing the angle at which an observer is viewing the surface. The scattered waves of light can interfere constructively or destructively, like the reflected waves.

Figure 2C:
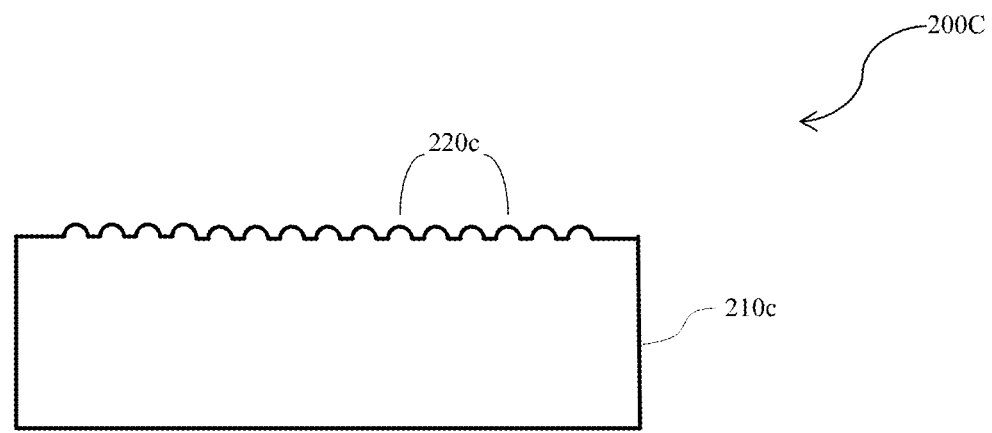
FIG. 2C shows a cross-sectional view of another surface having a structured optical appearance with structural features.
Figure 2D:
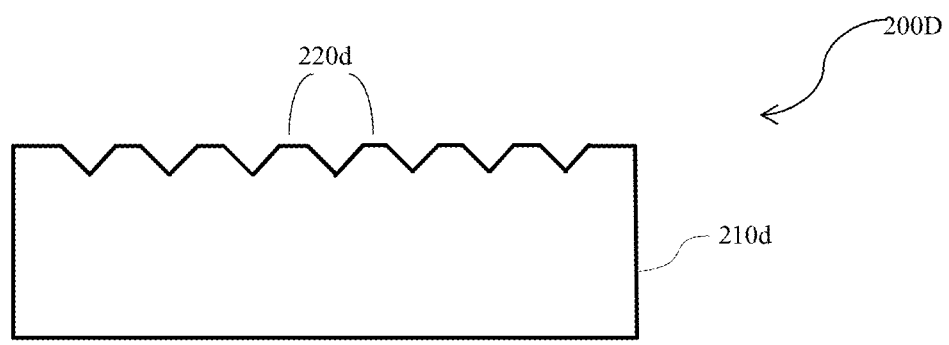
FIG. 2D shows a cross-sectional view of another surface having a structured optical appearance with structural features.

In some embodiments, the shape of the structural feature can be designed to create a specific visual appearance. The structural features can have any shape. For example, in FIG. 2B, the structural features can be shaped to be a series of concave features 220b on substrate 210b. In FIG. 2C, the structural features can be shaped to be a series of convex features 220c on substrate 210c. In FIG. 2D, the structural features can be shaped to be a series of triangular indentations 220cd on substrate 210d. It will be recognized by those skilled in the art that other shapes are possible. Also, as depicted, the size of the structural features as well as the number of structural features can vary. In various embodiments, the structural features can be any size, ranging from nanometer scale to millimeter scale. In various embodiments, the surfaces having a structured optical appearance can have any number of structural features.

In some embodiments, the size of the structural feature can be designed to create a specific visual appearance. In some embodiments, the structural features can be nanoscale and have a size on the order of nanometers. In other embodiments, the structural features can have a size on the order of microns. In still other embodiments, the structural features can have a size larger than the wavelengths of visible light, while being smaller than a size that the eye of an observer can resolve. As such, the structural features create a plurality of reflective surfaces, which result an in an observer seeing the average effect of a plurality of angles, thereby removing the viewing angle dependency of the visual appearance. By way of example, without intending to be limiting, an observer who is normal to the surface would perceive a flat surface at first viewing angle of 0° at a first location, and perceive a second viewing angle at a second location, a third viewing angle at a third location, and so on. However, when a series of structural features are created on the surface that create a plurality of reflective surfaces, rather than an observer perceiving the length of the surface at different viewing angles, the observer perceives the length of the surface at a single viewing angle because the plurality of reflective surfaces provide an averaging effect. The number of structural features can also impact the average effect perceived by an observer.

Figure 3:
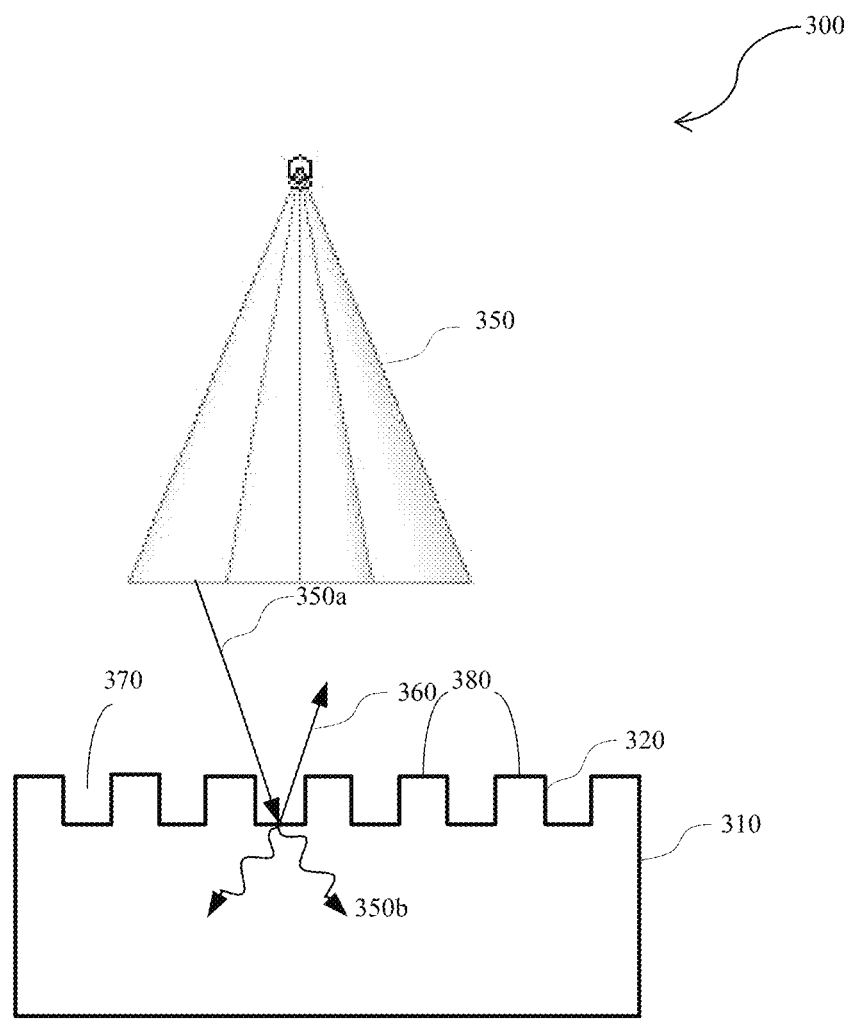
FIG. 3 shows a cross-sectional view of another surface having a structured optical appearance with other structural features on a substrate and how a portion of an incident light beam is absorbed, in accordance with embodiments of the disclosure.

In other embodiments, the structural features on the substrate can create an optical effect through absorption of specific frequencies or wavelengths of light. In such embodiments, as shown in FIG. 3, structural surface 300 includes substrate 310 with structural features 320 that act as quantum wells (e.g. a potential well with only discrete energy values) that have a resonant frequency and absorb a selected frequency and/or wavelength of light because of gap 370 between peaks 380 of structural features 320.

In operation, when an incident beam of light 350 impacts surface 300, a portion of the beam will be absorbed in the gaps, thereby altering the light wave that is transmitted back, thus altering the visual appearance of the surface. Gap 370 between peaks 380 can be any size and shape and be selected to absorb a specific wavelength of light. As illustrated in FIG. 3, an incident beam of light 350 can include light wave 350*a* impact surface 310 at gap 370. A portion of light wave 350*a* can be absorbed 350*b* in gap 370, while a remaining portion is reflected wave 360. Additionally, peaks 380 also reflect a portion of light beam 350 that impacts peaks 380. The light reflected by peaks 380 is not depicted in FIG. 3, but the reflected waves behave in a manner similar to that, shown in FIG. 2A, for reflected waves 260*a* and 260*b*.

The visual spectrum of light ranges from about 390 nm to 700 nm and has a frequency that ranges from about 430 THz to 770 THz. Within the spectrum of visible light, red, green, and blue are considered spectral (or primary) colors, while all other colors (e.g. orange, yellow, and purple) are mixed colors. In some embodiments, gap 370 may be selected to absorb a particular wavelength (or a narrow band of wavelengths) of light to enhance the color of the surface, making it appear more vivid. As such, by way of illustration, if it is selected to make a red surface visually appear as a truer red (e.g. 609-614 nm); the gap can be designed to absorb a wavelength (e.g. 585-600 nm) that is associated with an orange color, so the red appears more vivid. This example is not intended to be limiting, and other combinations of colors, wavelengths, and/or frequencies of the spectrum of light are possible.

In still other embodiments, the visual appearance of the surface can be adjusted by creating a surface having a structured optical appearance that includes colloidal or suspended particles with a periodic pattern in matrix. Specific optical effects can be designed by selection of the particle size, the particle shape, the order (i.e. periodicity) of the particles, and index of refraction of the particles, as well as the index of refraction of the matrix of the particle coating. Like other embodiments, the surface having a structured optical appearance that includes colloidal or suspended particles can be used to visually alter the color, opacity, and/or haze of a substrate based on a visual preference. For example, in some embodiments, the colloidal or suspended in matrix can be design to have a particular color and/or haze depending on the viewing angle and/or the incident light source. In still other embodiments, the colloidal or suspended in matrix can change depending (i.e., tunable) on influences from the environment (e.g., temperature, humidity, electric field, magnetic field, etc.) in which the surface having a structured optical appearance is exposed. In some embodiments, the visual appearance (color, haze, and/or opacity) of the surface having a structured optical appearance with the colloidal or suspended particles in the matrix can change permanently in response to the environmental stimuli, while in other embodiments, the visual appearance of the surface having a structured optical appearance can be resettable. For example, by way of illustration without intending to be limiting, in some embodiments having a suspended particle coating, the surface can change color when exposed to magnetic field, and then revert back to the original color when the magnetic field is removed.

Figure 4A:
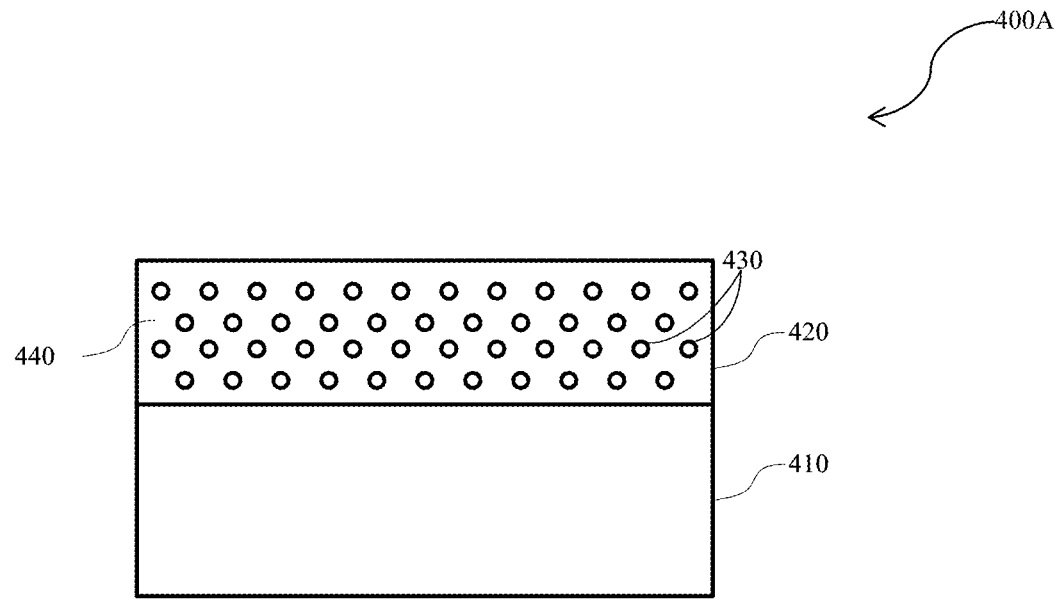
FIG. 4A shows a cross-sectional view of another surface having a structured optical appearance with an ordered particle coating on a substrate, in accordance with embodiments of the disclosure.

As shown in FIG. 4A, a surface having a structured optical appearance 400A can include an ordered array of suspended particles 430 in particle coating 420 on substrate 410. Surface 400A with particles 430 suspended in particle coating 420 can be used to visually alter the color, opacity, and/or haze of a substrate based on a visual preference, as described above. In particular, the coating 420 includes particles 430 suspended in matrix 440. The selection of the particle material, particle size, the particle shape, the order (i.e. periodicity) of the particles, and index of refraction of the particles, as well as the index of refraction of the matrix of the particle coating can be used to change the visual appearance (color, opacity, haze, brightness, etc.) of the surface. Substrate 410 can be may be formed of a glass or metallic glass. In other embodiments, substrate 410 may be a metal (e.g. aluminum, stainless steel, etc.), a plastic, a soft good, or other suitable material.

In some embodiments, the visual appearance of the surface can be designed by altering the index of refraction of the matrix and/or particles. Particle coating 420 includes particles 430 that are disposed in matrix 440. Particles 430 and matrix 440 are different materials that have different refractive indices. In some embodiments, matrix 440 may be a polymer, a ceramic, a metal, or any other material. In some embodiments, the polymer may be an elastomeric material, such as a polymeric elastomer. In other embodiments, the matrix may be a curable material. In some embodiments, the curable material may be a silicon-containing polymer, polyacrylamide, polyethylene oxide, polyethylene glycol diacrylate, polypropylene glycol diacrylate, polyvinyl alcohol, polyacrylate or a copolymer thereof. Other materials for the matrix are possible.

In some embodiments, particles 430 can be a ceramic (e.g., silica, alumina, etc.), an organic material (e.g., polymer, acrylic, etc.), a void, or any other suitable material. The material selection of the particles should be one that is readily shapeable. In some embodiments, the particles will be the same material, while in other embodiments, the particles can be a combination of two or more different materials. In some embodiments, a material can be disposed in an ordered array within the matrix and then sintered to create a void.

In some embodiments, the visual appearance of the surface can be affected by selection of the ordered arrangement of the particles with in the matrix. When particles 430 are suspended within matrix 440 in an ordered array, photonic bans form such that certain wavelengths of light can be reflected or transmitted, thereby creating a specific visual appearance. Particles 430 can be disposed within matrix 440 in any ordered (periodic) arrangement. In some embodiments, particles 430 can be arranged to create a 2-dimensional array, while in other embodiments, they can be arranged to create a 3-diminsional array. The particles can be disposed in the matrix in any ordered array, such as body centered cubic (bcc), face centered cubic (fcc) (also called cubic closed pack), hexagonal closed pack (hcc), or any other ordered packing arrangement.

In other embodiments, like the optical coatings, particle coating 420 with particles 430 suspended in matrix 440 can be deposited in a pattern on substrate 410. In such embodiments, particle coating 420 can be selectively deposited on portions of substrate 410 to change the visual appearance in select portions of the substrate while other regions of the substrate have a visual appearance that remains alternated. In such embodiments, the particle coating can be deposited on regions of the surface while other portions of the surface do not have coatings, as illustrated in FIG. 4B.

Figure 4B:
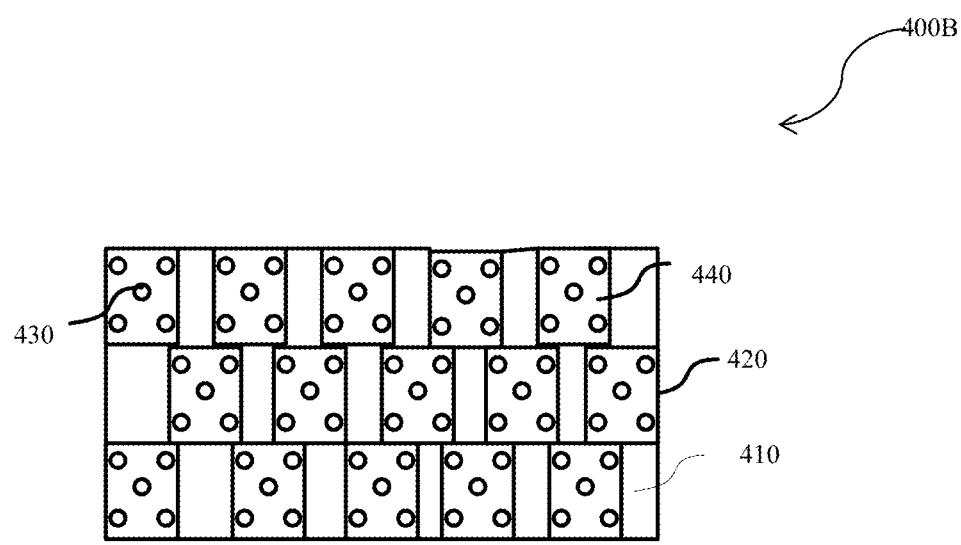
FIG. 4B shows a cross-sectional view of surface having a structured optical appearance with an ordered particle coating selectively deposited on a substrate, in accordance with embodiments of the disclosure.

As shown in FIG. 4B, particle coating 420 with particles 430 suspended in matrix 440 is selectively deposited on portions of substrate 410, while other portions of substrate 410 do not have particle coating 420. Particle coating 420 can be deposited in any pattern, such as a stripped pattern (as shown in FIG. 1C), a checkered pattern (shown in FIG. 1D), a polka dotted pattern (as shown in FIG. 1E), or any other pattern.

Figure 4C:
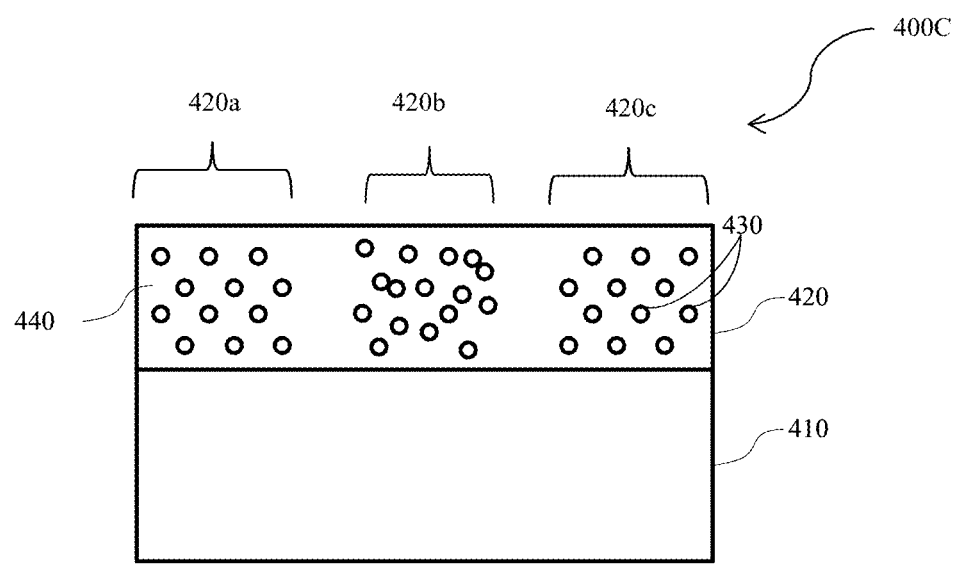
FIG. 4C shows a cross-sectional view of yet another surface having a structured optical appearance with an ordered particle coating on a substrate, in accordance with embodiments of the disclosure.

In other embodiments, a pattern can be designed by having portions of particle coating 420 containing an ordered array of particles 430 and portions where particles 430 are not in an ordered arrangement. As illustrated in FIG. 4C, in some embodiments, particles 430 can be an in ordered arrangement in regions 420a and 420c, while disordered in region 420b. Ordered arrangements in regions 420a and 420c reflect a wavelength or range of wavelengths, thereby creating a structured optical appearance. Disordered region 420b does not reflect a wavelength or range of wavelengths. Ordered regions 420a and 420c, and disordered region 420b, can be replicated throughout particle coating 420 to create bands of colors or other variations in the visual appearance to create patterns on surface 400C. In other embodiments, for the variations in the visual appearance can include opacity, haze, brightness, intensity, etc.

In yet other embodiments, the surface having a structured optical appearance can be a three-dimensional structure that may be a photonic crystal. The photonic crystals can be made by using lithography, laser writing or other layer deposition techniques that build the layers one by one, from the bottom-up. In other embodiments, the photonic crystals may be made using an etching technique and removing portions of the material to make a 3-D ordered structure, while in other embodiments, the 3-D structure can be made by milling or by drilling holes in a suitable substrate to remove material to make an ordered structure.

The embodiments described herein can be used to alter the visual appearance of substrate. In some embodiments, the surface with a structured optical appearance can be created to control the color, opacity, brightness, intensity, and/or haze of the surface of a substrate. The techniques of using multiple layers of different optical coatings, structural features, colloidal/particle suspended coatings, and photonic crystals can be combined in some embodiments. For example, a colloidal coating can be used as one of the coatings on the multi-layered coated surface, in accordance with embodiments of the disclosure, as illustrated in FIG. 5.

Figure 5:
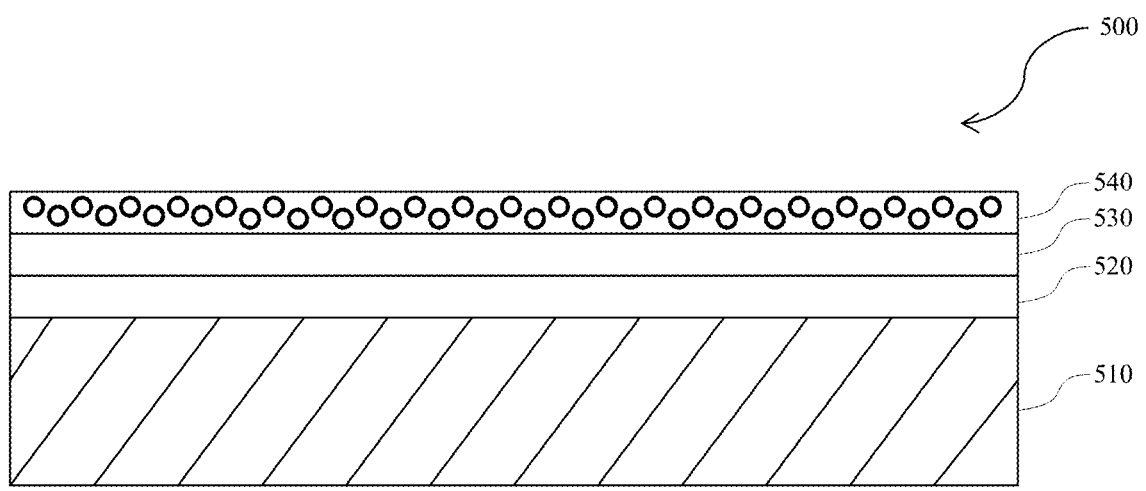
FIG. 5 show shows a cross-sectional view of a surface having a structured optical appearance with multiple layers of different optical coatings and a particle coating deposited on a substrate, in accordance with embodiments of the disclosure.

As shown in FIG. 5, a plurality of coatings can be deposited on substrate 510 to create a surface 500 with a structured optical appearance. Optical coatings 520 and 530, as well as particle coating 540 can be deposited on the substrate 510. Although, surface 500 is depicted as having three layers of coatings 520, 530 and 540 deposited on substrate 510, this is for illustrative purposes and not intended to be limiting, and any number of coatings from two or more may be used. Also, although particle coating 540 is depicted as the top coating, in other embodiments, it can be the bottom layer that is directly deposited on substrate 510 or a middle layer interposed between two adjacent layers of optical coatings.

Figure 6:
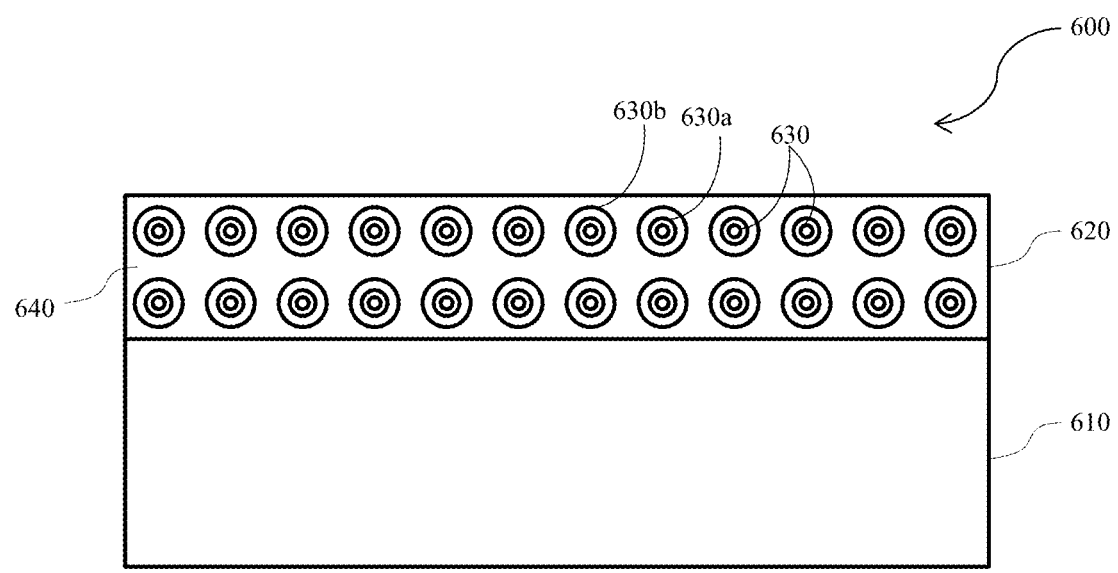
FIG. 6 shows a cross-sectional view of another surface having a structured optical appearance with an ordered particle coating on a substrate, where the particles are encased in a plurality of optical coating, in accordance with embodiments of the disclosure.

In other embodiments, the multiple layers of different optical coatings can be applied to the particles to create coated particles that can be suspended in an ordered array in a matrix, in accordance with embodiments of the disclosure. As shown in FIG. 6, a particle coating 620 can be deposited on substrate 610 to create surface 600 with structured optical appearance. Particle coating 620 can contain particles 630 suspended in matrix 640 in an ordered array. Particles 630 are encased with optically coatings 630a and 630b. Although, the particles are depicted as having two layers of coatings 630a and 630b, this is for illustrative purposes and not intended to be limiting, any number of optical coatings from one or more may be used.

Figure 7:
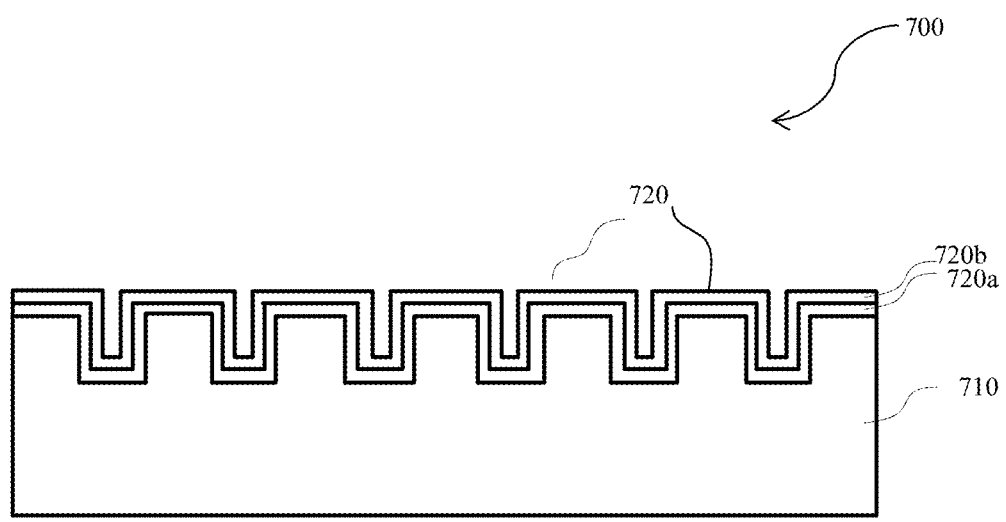
FIG. 7 shows a cross-sectional view of surface having a structured optical appearance with optically coated structural features, in accordance with embodiments of the disclosure.

In other embodiments, the multiple layers of optically different coatings can be applied to structural features on a substrate, as illustrated in FIG. 7. As shown in FIG. 7, surface 700 with structured optical appearance includes substrate 710 with structural features 720 and optical coatings 720a and 720b. Optical coatings 720a and 720b can be deposited on structural features 720. Although, structural features 720 are depicted as having two layers of coatings 720a and 720b, this is for illustrative purposes and not intended to be limiting, any number of optical coatings from one or more may be used.

In some embodiments, the visual appearance of the surface having a structured optical appearance may be adjustable based on a visual preference. Adjustment of the visual appearance of the surface can be made by using multiple layers of different optical coatings, structural features, suspended particles, or combinations thereof as described above. By way of example, without intending to be limiting, if it was selected that the visual preference for a surface was for the color associated with particular wavelength of light (e.g. 490 nm), then the surface having a structured optical appearance can be designed to transmit (e.g. reflect, diffract, scatter, and/or refract) back the particular wavelength. Other possible wavelengths in the visible spectrum are possible.

In other embodiments, the surface having a structured optical appearance can be used to visually alter the color, opacity and/or haze of a substrate depending on the viewing angle and/or the incident light source. By way of illustration, without limitation, the structured color surface could visually appear as a crystal blue when viewed at a first angle (e.g. 0° angle), while visually appearing as hazy when viewed at a different second angle (e.g., 50° angle). In other embodiments, the color can change depending on the light source (e.g. sunlight vs. artificial light). Conversely, in other embodiments, the surface having a structured optical appearance can be used to maintain the same color, opacity, or haze of a substrate independent of the viewing angle and/or contours on the substrate and/or light source. For example, without intending to be limiting, the surface having a structured optical appearance can be designed to have the same visual appearance (e.g. color) in both sun light and artificial light (e.g. florescence light). Other light sources are possible.

In other embodiments, the surface having a structured optical appearance can be designed to change depending on influences from the environment in which the surface having a structured optical appearance is exposed. In such embodiments, the surface having a structured optical appearance can have a visual appearance (color, haze and/or opacity) that is responsive or tunable to the environmental influences or stimuli. The environmental influences or stimuli can include temperature, humidity, light source, pressure, electrical field, magnetic field, chemical stimuli, biological stimuli, combinations thereof, or other environmental influences. In some embodiments, the visual appearance (color, haze and/or opacity) of the surface having a structured optical appearance can change permanently in response to the environmental stimuli, while in other embodiments; the visual appearance of the surface having a structured optical appearance can be resettable. By way of illustration, in such embodiments that are tunable, the visual appearance (color, haze and/or opacity) of the surface having a structured optical appearance can be blue when exposed to a first environmental stimuli, then green when exposed to a second environmental stimuli, and then red when exposed to a third environmental stimuli. In other embodiments, the visual appearance of the surface can be tunable in response to a magnetic or electric field. For an illustrative example, in some embodiments having a suspended particle coating, the surface can change color when exposed to magnetic field, but revert back when the magnetic field is removed. In some such embodiments, the suspended particles can be a magnetic material and be disposed in the matrix such that there is a lack of an ordered arrangement when a magnetic field is not present, but become ordered when a magnetic field is applied, thereby creating photonic bands and adjusting the visual appearance of the surface in response to the magnetic field. These examples are not intended to be limiting and other possible visual appearances are possible. In other embodiments, the surface having a structured optical appearance can be tunable based on product customization depending on consumer preferences.

In some embodiments, the responsiveness of the visual appearance to the surface having a structured optical appearance can act as a notification or sensor to alert an observer. The change in visual appearance can be used to sense temperature, humidity, and/or other environmental conditions. For example, the surface having a structured optical appearance may initially appear blue and when exposed to environmental stimuli (e.g. high temperature, high humidity, and chemical exposure), the surface can change to appear red to notify the observer that the surface having a structured optical appearance is being exposed to a harsh environment. In other embodiments, the surface having a structured optical appearance can be incorporated into a wear surface of an article having an initial thickness. As the surface of the article wears away and becomes thinner, the surface having a structured optical appearance can change its visual appearance to notify an observer that the article is wearing out. Other possible visual appearance changes are possible to provide other notification to an observer.

In addition, the surface having a structured optical appearance can have the advantage of allowing manufacturers to develop distinct visual appearances for articles and providing an anti-counterfeit effect due to difficulty in copying. Other advantages of the surface having a structured optical appearance can have a visual appearance that contrasts the feel and is surprising to an observer as it is unfamiliar. For example, without intending to be limiting, the surface having a structured optical appearance can be designed to have a visual appearance that looks like the surface has textured (e.g. rough) but feels smooth.

In practice, these surfaces having structured optical appearances can be used on the visible surface of a wide variety of articles of manufacture. The surfaces having structured optical appearances can be the housings or casings of articles, where the visual appearance (color, haze, opacity) can impact consumer selection. The articles can range in size from small personal electronic devices (e.g., smart watches, fitness trackers, cellphones, tablets, e-readers, etc.), and fashion items (e.g. footwear, hats, handbags, etc.) to large items (e.g. cars, trucks, boats, etc.). Other articles of manufacturing are possible.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A surface having a structured optical appearance comprising:
    a substrate; and
    an optical coating disposed on the substrate, the optical coating comprising:
    repeating first portions including particles in an ordered array within a matrix, the repeating first portions arranged in a first ordered pattern; and
    repeating second portions disposed between the first portions and arranged in a second ordered pattern, the repeating second portions each including particles in a disordered arrangement within the matrix, the matrix having a first refractive index and the particles having a second refractive index;
    the particles in the ordered array configured to selectively reflect a wavelength or a range of wavelengths of incident light waves that optically interfere with one another.

2. The surface of claim 1, wherein the ordered array is a face centered cubic packing arrangement.

3. The surface of claim 1, wherein the ordered array is a hexagonal closed packing arrangement.

4. The surface of claim 1, wherein the particles comprise a material selected from a ceramic and a polymer.

5. The surface of claim 1, wherein the particles in the ordered array are arranged in a three dimensionally ordered array.

6. The surface of claim 1, wherein each of the particles is a void.

* * * * *